US006714400B2

(12) United States Patent
Guerry et al.

(10) Patent No.: US 6,714,400 B2
(45) Date of Patent: Mar. 30, 2004

(54) LINK FOR WATCH BRACELET

(75) Inventors: Christophe Guerry, Oberbuchsiten (CH); Sébastien Bolzt, Neuchâtel (CH); Steeve Gerber, La Neuveville (CH)

(73) Assignee: Montres Rado S.A., Lengnau (CH)

( * ) Notice: Subject to any disclaimer, the term of this patent is extended or adjusted under 35 U.S.C. 154(b) by 27 days.

(21) Appl. No.: 10/229,214

(22) Filed: Aug. 28, 2002

(65) Prior Publication Data

US 2003/0043698 A1 Mar. 6, 2003

(30) Foreign Application Priority Data

Aug. 29, 2001 (CH) .............................................. 1608/01

(51) Int. Cl.[7] .......................... G04B 37/00; F16G 13/06
(52) U.S. Cl. ................................ 361/282; 59/80; 59/84
(58) Field of Search ................................ 368/281–282; 59/78, 80, 82, 84–90

(56) References Cited

U.S. PATENT DOCUMENTS 3,857,235 A 12/1974 Brauchi
4,051,668 A * 10/1977 Learn ............................ 59/80
5,365,753 A 11/1994 Carrola
6,345,492 B1 * 2/2002 Luscher et al. ................ 59/80

FOREIGN PATENT DOCUMENTS

FR 634 132 2/1928
GB 2 137 475 10/1984

* cited by examiner

*Primary Examiner*—Vit W. Miska
(74) *Attorney, Agent, or Firm*—Sughrue Mion, PLLC

(57) ABSTRACT

The invention concerns a particular link structure (1) for a wristwatch including decorative elements made of hard materials such as ceramics. The sintering step carried out during manufacturing of these decorative elements increase the maximum uncertainties on their dimensions. The parts thereby obtained consequently do not have sufficiently precise dimensions to avoid the appearance of gaps at their common junctions. In order to overcome this drawback, the link (1) according to the invention includes a mechanical device (17, 26, 29, 34, 37, 53) allowing a precise adjustment to be made of the relative positions of these different decorative elements and consequently continuous junctions to be obtained between them.

22 Claims, 6 Drawing Sheets

101

Figure 1:
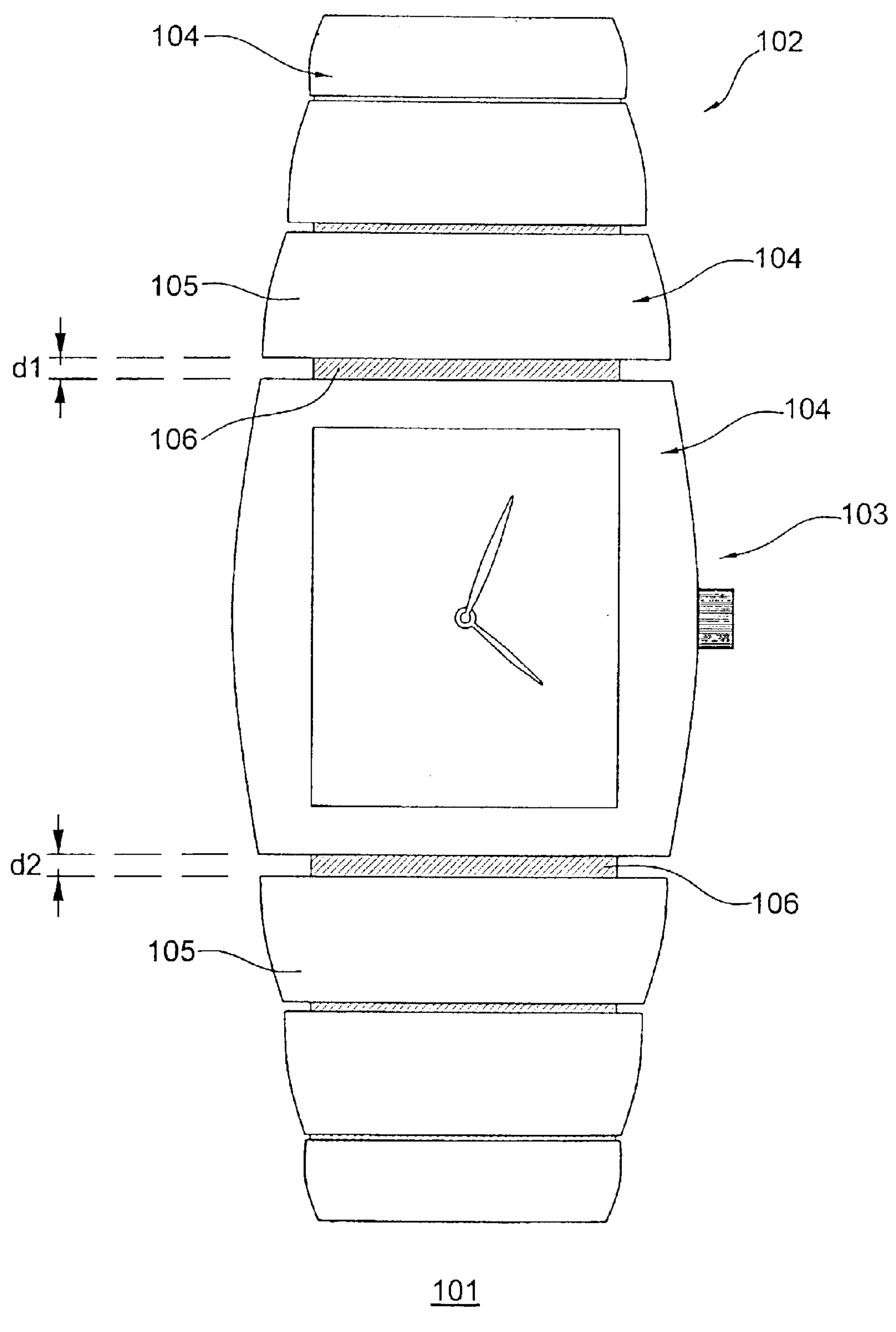

F
F
1
2
3
4
9
10
11
12
13
15
18
20
22
23
26

LINK FOR WATCH BRACELET

The present invention concerns a link, provided for connecting a bracelet to a watch case, the latter including an exterior or decorative element which defines at least partially its limits in the longitudinal direction of the bracelet, the exterior element being obtained by a method including a sintering step.

The invention concerns more generally the field of watch bracelets partially made of hard materials, such as ceramics, intended to be assembled on watches whose case includes exterior parts made of a hard material.

A bracelet of this type, including a more or less flexible inner structure assuring the function of a core or frame and at least partially covered by decorative elements is known to those skilled in the art.

American U.S. Pat. No. 5,365,753 discloses a bracelet, in particular for a watch, including an inner chain formed of articulated links, connected to each other by hinges. Each of these links, formed of two structural elements, is covered by an exterior decorative element made of ceramic material. Further, each link includes means for holding the corresponding decorative element so as to obtain an advantageous aesthetic effect, insofar as the various hinges connecting the links to each other are never visible.

However, this structure has certain limits in its application, as do generally known bracelets of this type in the prior art. Indeed, the decorative parts made of hard material, for example, ceramic material, are obtained by methods including a moulding step followed by a sintering step. During this sintering step, these parts undergo a contraction, i.e. a significant reduction in volume, via the combined actions of heat and pressure, this contraction being able to be more than 30% of the initial volume. Commonly implemented methods currently allow such parts to be manufactured with tolerances on the dimensions of the order of 0.5 to 1%, the sintering step making it difficult to obtain lower tolerances. It should be noted that these tolerances fluctuate as a function of the batches of raw material used.

The tolerances involved result, for example, in uncertainties of the order of a fifth of a millimetre over the length of a ceramic watchcase of 3 centimetres. Insofar as this type of watchcase is in the top of the watchmaking range, such uncertainty is difficult to accept for manufacturers.

Consequently, the prior art provided manual machining, after the sintering step, in order to eliminate the various play existing between the ceramic elements of the exterior parts of such a watch.

However, faced with the increasing client demand for such products, the number of watchmaking parts including ceramic decorative elements to be manufactured has greatly increased over the last few years, making the machining steps very laborious, given the quantity of parts to be processed. Moreover, this machining step is made more difficult because of the increasing complexity of the geometry of watch cases currently being made, which makes it complicated to lock the part into a given position in order to work on it.

It should be noted that this problem is all the more inconvenient because the decorative parts to be manufactured are large. In particular, the aforementioned manufacturing tolerances have detrimental impact on the watchcase, whose dimensions are generally larger than those of the bracelet links. Likewise, the more the manufacturer of such timepieces wishes to make bracelet links of greater dimensions, the more difficulty he will have in making junctions between the watch case and the bracelet or between bracelet links having a satisfactory aesthetic appearance.

The main object of the present invention is to overcome the aforementioned drawbacks of the prior art and to improve the aesthetic appearance of existing timepieces.

The invention therefore concerns a link for a watch bracelet of the aforementioned type, characterised in that it includes a first hollow element provided with first means for attaching it to the bracelet, a second element one part of which is nested in the first element and carrying second means for attaching said second element to the watch case and a third exterior decorative element, secured to the first element and at least partially covering the second element on the side of the second attaching means. The link according to the present invention is further characterised in that it includes a mechanical device allowing a translation of the first element with respect to the second element in the direction of the bracelet, so as to apply the third decorative element against the decorative element of the watchcase.

As a result of these features, it is possible to adjust the position of the bracelet with respect to the watchcase in order to correct the problems of manufacturing tolerances. As a result of such an adjustment an uninterrupted junction is obtained between the bracelet and the watchcase, which is advantageous from the aesthetical point of view.

In a first embodiment, the first element is hollow and the mechanical device is housed therein in the form of resilient means, such as one of more springs or an elastomer block. These resilient means exert a return force on the first element so as to bring it closer to the second end of the second element, the latter carrying the second attaching means and extending outside the first element through an aperture made in one wall of the latter. The result obtained by applying this return force is to bring the third decorative element of the link permanently closer to the watch case, independently of the value of the watch case's manufacturing tolerances.

In an alternative embodiment, the volume left free by the mechanical device in the first hollow element is made impervious or sealed with respect to the external environment, as a result of the use of a particular structure and suitable sealing gaskets. This feature may be advantageously used to house various electronic components or even a battery in the first element.

In another embodiment, the mechanical device includes means for adjusting the position of the bracelet with respect to the watchcase. In other words, the adjustments are carried out when the bracelet is attached to the case, such that the junction is uninterrupted, and can be modified subsequently. These means may, in particular, include an adjusting screw, connected in various ways to the various elements of the link according to the present invention.

The screw may in fact be housed in a hole arranged in the second link element, buffers may be arranged on the screw on either side of the second element, these buffers being capable of being moved in a perpendicular direction to that of the bracelet, at least one of the buffers being provided with a screw thread. Moreover, at least one oblique guide with respect to the direction of the bracelet is arranged, for each buffer, on the wall of the first element including the aperture and/or on the first end of the second element, so that each of the oblique guides is stopped against the corresponding buffer, and that any rotation of the screw is able to modify the distance between the buffers and thus the relative positions of the first and second elements.

This variant advantageously allows very precise adjustment of the position of the first element with respect to the second element, and thus the position of the third decorative element with respect to the watchcase.

In another variant, the first and second link elements may also respectively have lateral surfaces located opposite each other which are at least partially in contact with each other, the screw passing through an aperture in the second element which has an elongated oblong section, the threaded end of the screw being housed in a tapped hole arranged through said surface of the first element whereas the head of the screw is, in the screwed in position, stopped against a face of the second element opposite said surface in contact with the first element.

This variant allows a lower level of adjustment precision to be obtained than that accessible with the preceding variant, but has the advantage of greater construction simplicity.

Another variant provides that the head of said screw is housed so as to rotate freely in the wall of said first element opposite said wall including the aperture, whereas the threaded end is housed in a tapped hole of said end of the second link element located inside said first element.

Thus, even if the head of the screw is not as accessible as in the preceding variants, a high level of precision can be obtained while having great construction simplicity.

The invention also concerns a watch bracelet as defined in claim 18 annexed hereto.

The wristwatch thus obtained therefore has an advantageous aesthetic appearance because of the continuity existing between the bracelet and the case.

Each of the links of the bracelet may also include a similar structure to that of the link forming the junction between the bracelet and the watchcase, so as to assure continuity of the junctions across the entire watch.

Figure 2B:
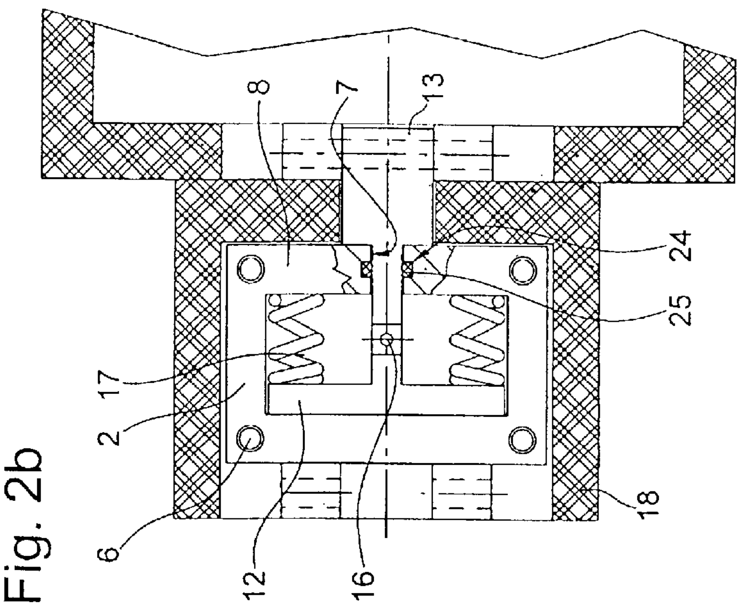
Figure 2A:
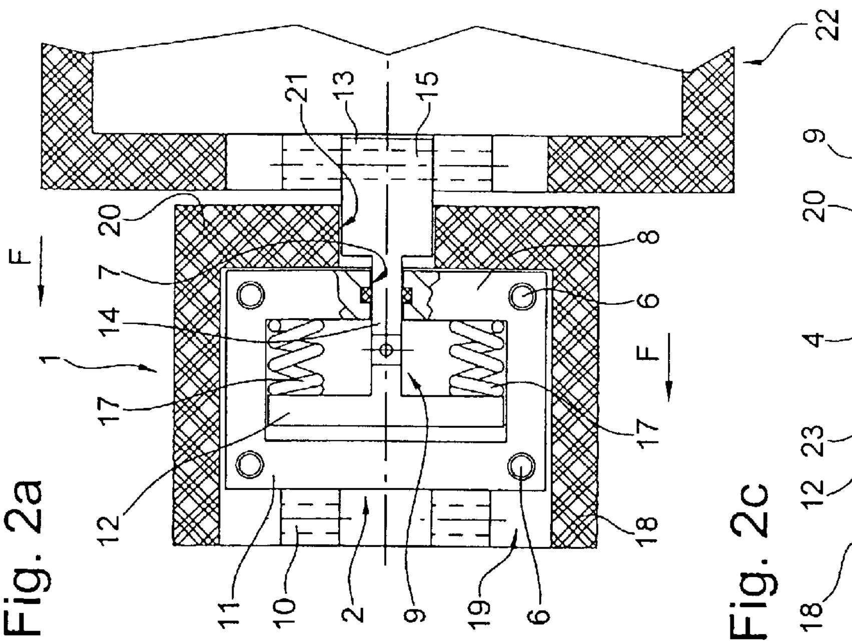
Figure 2C:
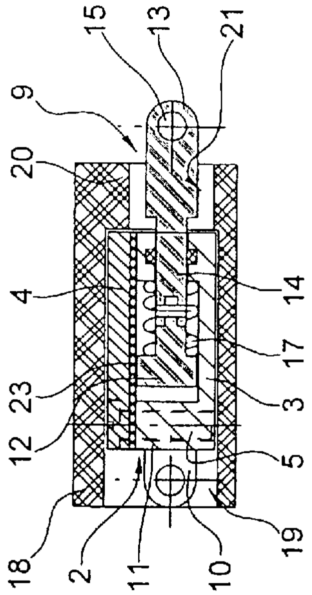
Figures 3A, 3B:
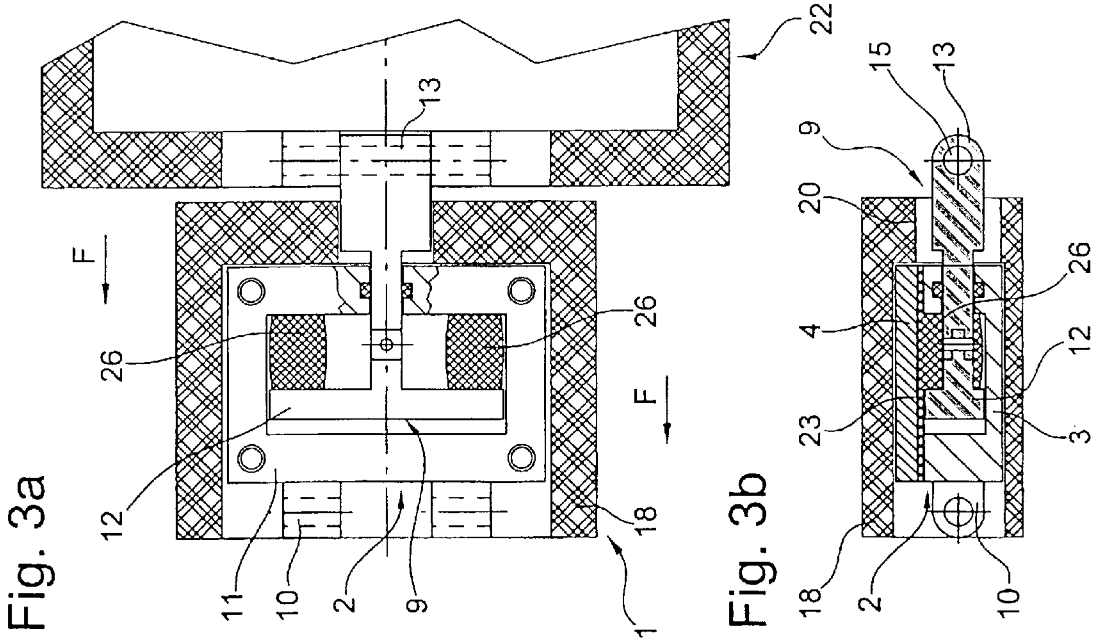
Figure 4B:
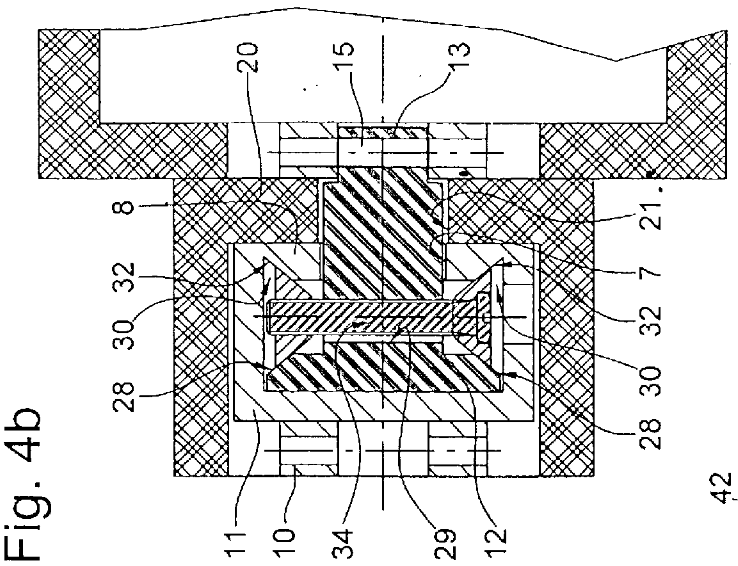
Figure 4C:
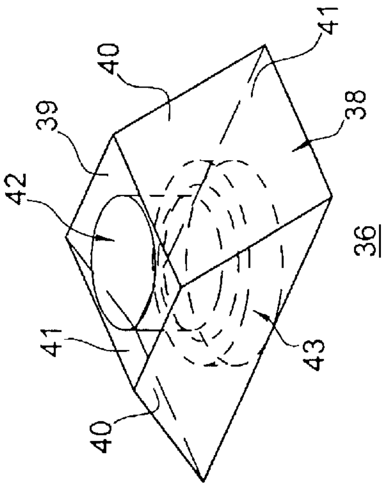
Figure 4A:
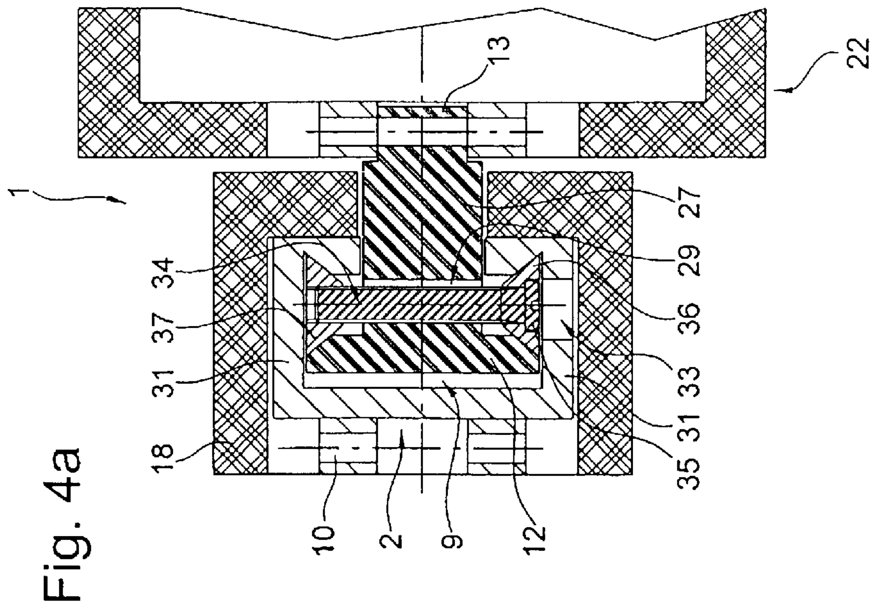

Other features and advantages of the present invention will appear more clearly upon reading the following detailed description, made with reference to the annexed drawings given by way of non limiting examples in which:

FIG. 1 shows a perspective view of a wristwatch including links in accordance with the prior art;

FIGS. 2*a* and 2*b* show a schematic cross-section of the upper plane of the first bracelet link element made in accordance with a first embodiment of the invention, said link being connected to a watch case;

FIG. 2*c* shows a cross-section along the line II—II of FIG. 2*a* without the watchcase;

FIGS. 3*a* and 3*b* show similar views respectively to those of FIGS. 2*a* and 2*c* for a second embodiment of the invention;

FIGS. 4*a* and 4*b* show schematic cross-sections of the median plane of the link according to the invention in two different configurations for a third embodiment of the invention;

FIG. 4*c* shows an enlarged perspective view of a part of the link visible in FIGS. 4*a* and 4*b;*

Figure 5B:
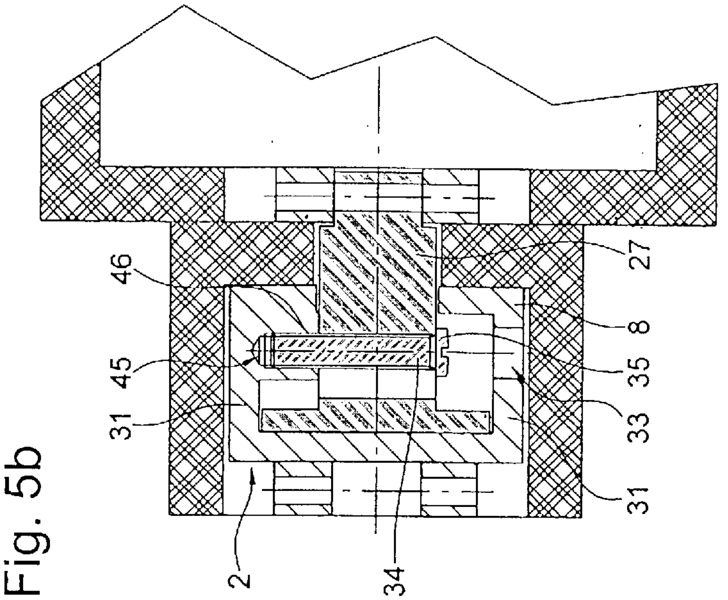
Figure 5A:
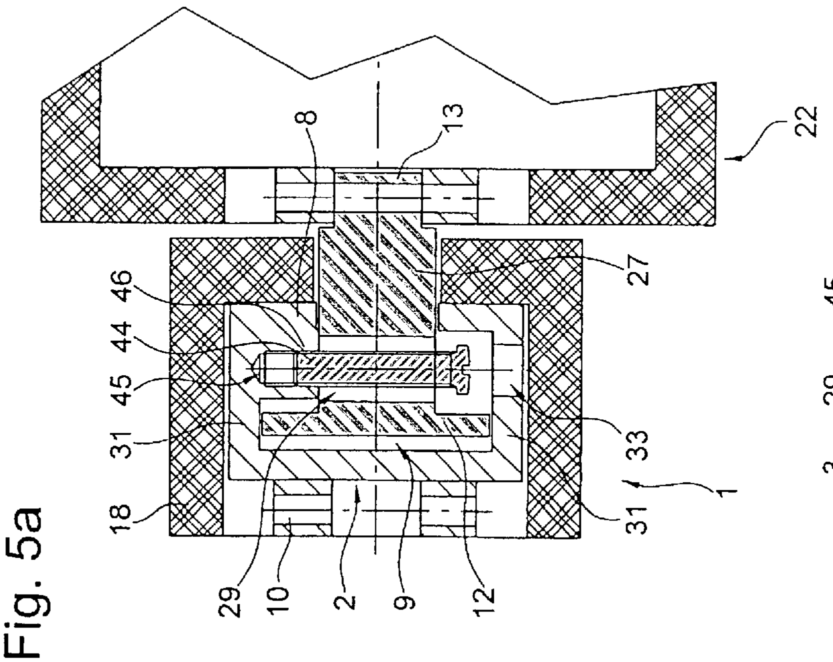
Figure 5C:
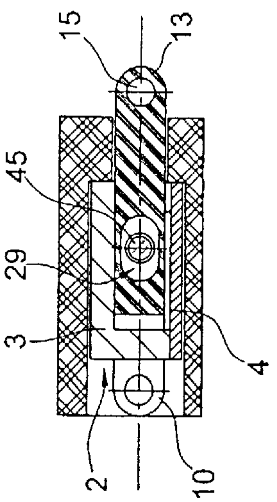
Figure 6B:
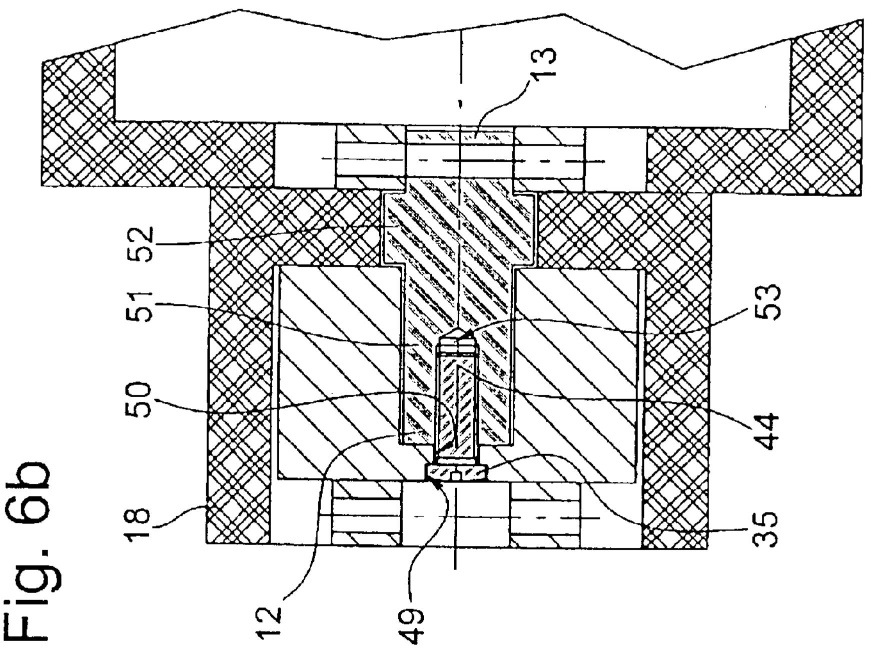
Figure 6A:
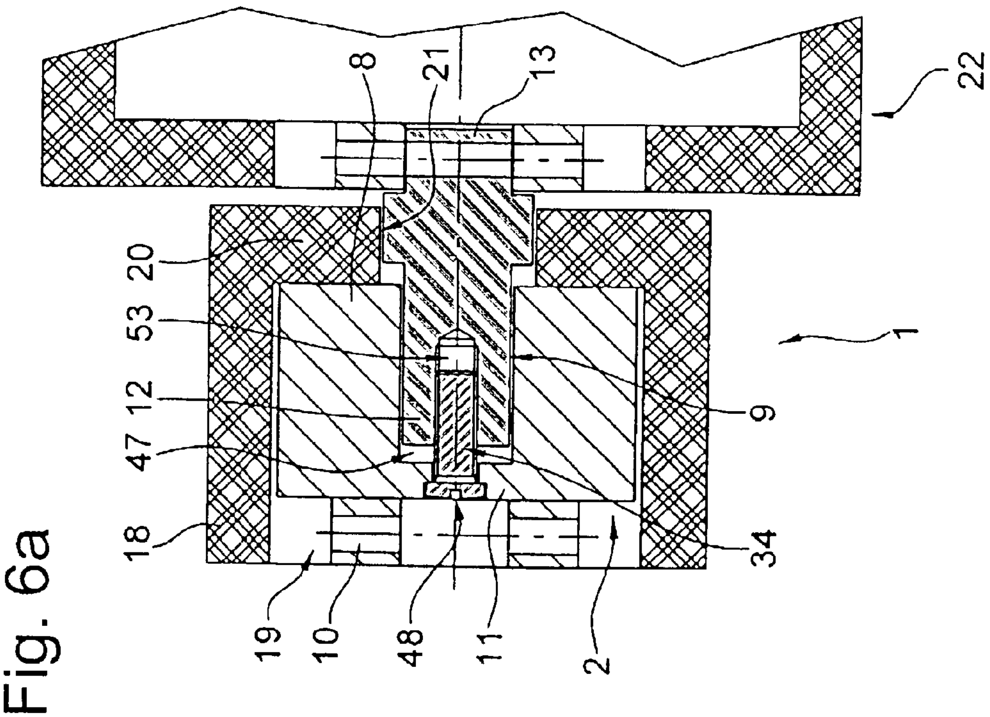

FIGS. 5*a* and 5*b* show similar views respectively to those of FIGS. 4*a* and 4*b* for a fourth embodiment;

FIG. 5*c* shows a schematic cross-section along the line V—V of FIG. 5*a* without the watch case, and FIGS. 6*a* and 6*b* show similar views respectively to those of FIGS. 4*a* and 4*b* for a fifth embodiment of the invention.

FIG. 1 shows a wristwatch 101 in accordance with the prior art including a bracelet 102 connected to a watch case 103, the latter both including an inner structure, which is not visible, covered by a ceramic decorative element 104. It will be noted in this Figure that, on either side of case 103, play, noted d1 and d2, are apparent at the junctions between said case and the first links 105 of bracelet 102.

These play d1 and d2 originate, as mentioned hereinbefore, from manufacturing tolerances in decorative elements 104. In the case of watch 101 shown here, the bracelet decorative elements are arranged on the inner structure in predetermined fixed positions. Consequently, dimensional variations in the various consecutive decorative elements lead to the appearance of gaps between them, which has the unfortunate consequence, from the aesthetic point of view, of leaving means 106 for attaching the bracelet onto the case visible.

The present invention allows the aforementioned problem to be overcome by using a link having a particular structure to establish the mechanical connection between the bracelet and the case.

FIGS. 2*a*, 2*b* and 2*c* show such a link 1 according to a first embodiment of the invention. Link 1 includes a first hollow element 2, of generally parallelepiped shape, shown here with a bottom 3 in its lower part and closed by a cover 4. By way of example, screws 5 have been provided to secure cover 4 to first element 2, the screw heads being arranged in abutment against the cover whereas their threaded rods cooperate with tapped holes 6 of the first element.

First element 2 includes an aperture 7, preferably substantially circular, at the centre of one 8 of its walls so as to allow the passage of an elongated part of a second element 9 through said wall 8. First element 2 also includes means 10 for attaching it to the next link, of a common type, such as hinges shown in the Figures, arranged on wall 11 of first element 1 opposite said wall 8 and used in combination with a common type of bar (not shown).

It should be noted that the link described hereinafter could be used not only to attach a bracelet to a watchcase, as shown here, but also to form the whole of a watch bracelet. In the second alternative, it is clear that attaching means 10 can also be used to establish the mechanical connection with the bracelet attachment means, such as an unfolding buckle.

Second element 9 has a general elongated shape, a first of its ends 12 being housed inside first hollow element 2, whereas the second end 13 is located outside. The first end 12 extends perpendicularly to the longitudinal direction of the bracelet, in a rectangular shape whose dimensions are slightly less than the inner dimensions of the first element. The second element further includes a rod 14, of substantially circular section and slightly smaller than aperture 7. Said rod 14, starting from the centre of first end 12, passes through said aperture 7, as far as a region having a larger section defining said second end 13. Second end 13 includes a bore 15 fulfilling the function of a hinge, or attaching means, capable of accommodating a bar to establish the connection of second element 9, and thus of link 1, to the watch case (partially schematised).

In the case of a bracelet wherein all the links include a structure according to the present invention, said bore can also establish the mechanical connection between the preceding link, more precisely with said attaching means 10 of the next link.

It should be noted that, for reasons connected with the assembly of the link, said second element includes two distinct parts the junction of which is made at rod 14 by means of a key 16 of the conventional type. This indispensable structural feature in fact allows said element 9 to be assembled through aperture 7.

A particular mechanical device, according to the invention, is housed in first hollow element 2. More precisely, two helical springs 17 are inserted, in first hollow element 2, between first end 12 of the second element and wall 8 of the first element, on either side of rod 14. When second element 9 is arranged such that its first end 12 abuts against wall 11 of the first element, as shown in FIG. 2*b*, the springs are in a slightly compressed state.

The link further includes a third main element 18 which fulfils a covering or decorative function. In the example shown, this third decorative element 18 has a generally hollow parallelepiped shape and is preferably made of ceramic material. The inner dimensions of said third element 18 are substantially greater than the external dimensions of first element 2 and one of its walls 19 is entirely open, so as to be able to house said first element 2 inside third element 18. Furthermore, the wall 20 opposite said wall 19 includes an aperture 21 of substantially greater dimensions than that of second end 13 of second element 9 so as to leave a passage free for the second element. Consequently, when link 1 is assembled, third decorative element 18 at least partially covers the first and second elements.

In the example shown in the Figures, the structure of link 1 is such that first element 2 is entirely covered by said third decorative element 18.

It will be noted that insofar as springs 17 abut against first end 12 of second element 9, they tend to cause a translation of said second element 9 in the longitudinal direction of the bracelet. More exactly, springs 17 exert a return force on second element 9, symbolised by the arrows referenced F in FIG. 2*a*, so as to bring second end 13 closer to first element 2. Once the mechanical connection of link 1 to case 22 of the watch is carried out at said second end 13, the result obtained by the operation of the structure described hereinbefore is to bring said watch case 22 and link 1 closer together, until the decorative element of case 22 and third decorative element 18 of the link are in abutment against each other. One then obtains, in such a configuration, a junction between said link 1 and said case 22, which has no interruption, which is advantageous from the aesthetical point of view.

It may be noted that additional structure elements appear in FIGS. 2*a*, 2*b* and 2*c*, which have been shown by way of non-limiting example.

In fact the interior of the first link element has been made impervious, first of all to protect the return mechanism from moisture or dust capable of coming from the external environment. One may also advantageously use the available inner volume of the first element to arrange electronic components, or a battery for example, inside said volume. For this purpose, a flat gasket 23, visible in FIG. 2*c*, is inserted between the upper surface of first element 2 and cover 4 which closes said first element. Moreover, an annular groove 24 is arranged in the wall of first element 2, in aperture 7, allowing an O-ring type joint to be arranged therein, visible in FIG. 2*c*, assuring an impervious sealing between first element 2 and rod 14 of second element 9.

Since this additional feature does not constitute the core of the invention and it is known from the prior art, it will not be described in further detail in the present application.

In the following detailed description, the structural elements that have already been described hereinbefore bear the same reference numbers as in FIGS. 2*a* to 2*c* in order to facilitate comprehension of the invention.

FIGS. 3*a* and 3*b* show a variant of the embodiment which has just been described. Indeed, the only difference distinguishing these two variants concerns the nature of the mechanical device used to exert the return force on second element 9. It will be noted in FIG. 3*a* that springs 17 have each been replaced by a block 26 of parallelepiped shape, preferably made of rubber or any other elastomeric material. Blocks 26 are shown in a compressed state in FIG. 3*a*, thus in a configuration such that they exert a return force on second element 9 so as to cause watch case 22 and link 1 to come closer together. Said blocks 26 may also not be free in first element 2, but be integral with flat gasket 23, as can be seen in FIG. 3*b*. Thus, the stability of their position in first element 2 and thus the proper working of the mechanical return device are assured.

The working of the invention according to this embodiment is the same as for the previously described embodiment, as is the result obtained.

The following embodiments are based on a different operation to that previously described in as far as the mechanical device housed in first element 2 no longer has the function of assuring a return force onto second element 9 of link 1 but a simple adjustment.

In the variant shown in FIGS. 4*a* and 4*b*, first and second elements have shapes different from that already described.

Second element 9 of link 1 is made here in a single piece including two main parts perpendicular to each other, one of which defines first end 12, whereas the other 27 carries second end 13. Said first end 12 has a generally parallelepiped shape wherein the two edges orthogonal to the longitudinal direction of the bracelet and located on the side of second main part 27 are truncated, so as to define two inclined planes 28. Second main part 27 extends, from the middle of first ends 12, in a generally elongated parallelepiped shape in the longitudinal direction of the bracelet. It includes, in proximity to said first end 12, an aperture 29 passing through it widthways and having an oblong section. It further includes, opposite said first end 12, a bore 15 fulfilling the function of a hinge, or attaching means, and defining the second end 13 of the second element. Said hinge 15 is capable of accommodating a bar (not shown) to establish the connection of second element 9, and thus of link 1, to watch case 22 (partially schematised).

The first element has, in its wall 8, an aperture 7 of rectangular section whose dimensions are slightly greater than those of the second main part 27 of second element 9. Said wall 8 further includes recesses 30 at each of its junctions with the lateral flanks 31 of first element 2. These recesses 30 thus define inclined planes 32 whose respective angles to the longitudinal direction of the bracelet are opposite to those of the angles of inclined planes 28 of first end 12, respectively located opposite.

One of said lateral flanks 31 of the first element includes a cylindrical aperture 33 whose function will be described hereinafter.

A screw 34 is arranged through aperture 29 of second element 9, the head 35 of said screw being arranged facing cylindrical opening 33 to be made accessible to an operator.

Two buffers 36, 37 are arranged on said screw 34, on either side of second element 9. Preferably, these buffers 36, 37 are made of an elastomer the choice of which will not pose any problem for those skilled in the art. As visible in FIG. 4*c* showing a perspective view of buffer 36, each of said buffers includes two parallel rectangular bases 38, 39 and four faces, of which two opposite faces 40 are perpendicular to said bases, the two other faces 41 being inclined with respect to the axis of the screw by an angle of the same value as said inclined planes 28 and 32 which are facing. The two faces 41 have a rectangular shape whereas the two other faces 40 are trapezoid. The buffers each further include a through hole 42, perpendicular to said bases at their centre.

A first buffer 36, located on the side of screw head 35, also includes a cylindrical recess 43 of dimensions such that said screw head 35 can be entirely housed therein. Said cylindrical recess 43 and said through hole 42 respectively have substantially larger dimensions than those respectively of screw head 35 and rod 34, so that a free rotation of screw 34 in buffer 36 is possible.

The second buffer 37 includes, in its through hole, an internal female screw thread co-operating with the threading of screw 34 and located in proximity to the end of screw rod 34.

It will be noted that in order to pass from the configuration shown in FIG. 4*a* to the configuration shown in FIG. 4*b*, screw 34 has been "tightened", in other words, said screw has been rotated in the clockwise direction. Indeed, when said screw 34 is rotated clockwise, buffer 37 effects a translation to come closer to the head 35 of said screw 34. Insofar as the position of buffer 36 is fixed with respect to said screw 34, the translation of buffer 37 towards screw head 35 causes said two buffers 36 and 37 to come closer together. This movement towards each other is made possible by sliding the inclined faces of each of the buffers on the corresponding inclined planes 28 and 32 forming oblique guides for said buffers. Said sliding further causes first end 12 of second element 9 and wall 8 of first element 2 to move away from each other. Said movement away from each other corresponds to a movement towards each other of second end 13 of second element 9 and first element 2, which also corresponds to a movement towards each other of link 1 and case 22, as is shown in FIG. 4*b*.

As a result of the operation of the mechanical device described hereinbefore, a continuous junction is obtained between link 1 and case 22 of the watch, which constitutes the desired aesthetic advantage.

The embodiment shown in FIGS. 5*a* to 5*c* also relies on the use of a screw 34 housed in first element 2 of link 1. As in the preceding embodiment, said screw is arranged through an aperture 29 of the second element, of oblong section of greater width than in the preceding embodiment, and its head 35 is accessible through an aperture 33 arranged in one of lateral flanks 31 of said first element. However, in the present variant, end 44 of the threaded rod of screw 34 is housed in a tapped hole 45, made in lateral flank 33 of the first element opposite to that including aperture 33.

In order to complete the mechanical adjustment device which has just been described, it will be noted that a large part 46 of lateral flank 31 including said tapped hole 45, close to wall 8 of the first element, has a greater thickness than the part of said flank 31 which is furthest from said wall 8. Thus, part 46 is in contact with the side of main part 27 of the second element located on the same side when screw 34 is in the tightened position, as shown in FIG. 5*b*.

In order to adjust the relative positions of link 1 and watch case 22, screw 34 is loosened in a similar position to that shown in FIG. 5*a*. In such a configuration, the friction forces occurring between part 46 of first element 2 and second main part 27 of second element 9 are low. Thus, a translation of first element 2 with respect to second element 9, or conversely, is made possible. Second element 9 is then arranged with respect to first element 2 such that, when link 1 is mounted on watchcase 22, the third decorative element 18 is flush with said case 22. Screw 34 is then tightened until its head 35 abuts against part 27 of second element 9, which has the effect of tightening second element 9 against part 46 of first element 2. In this configuration shown in FIG. 5*b*, the friction forces between the first and second elements 2, 9 are so great that a translation of one of these elements with respect to the other is no longer possible.

The wristwatch can then be assembled without its internal structure being visible at the junctions between case 22 and first links 1, located on either side of said case.

Link 1 according to another embodiment, shown in FIGS. 6*a* and 6*b*, also includes a screw 34 but arranged here in the longitudinal direction of the bracelet. The first element 2 has a simplified shape with respect to the preceding variants. Indeed, the general shape of element 2 is parallelepiped and includes a recess 47, also of parallelepiped shape, starting from wall 8, extending across the entire height of element 2 and most of its width. First element 2 further includes a cylindrical aperture 48 passing through first element 2 from its wall 11 as far as recess 47. Said aperture 48 includes, from wall 11 and in the longitudinal direction of the bracelet, two portions 49, 50 the first 49 of which has a larger diameter than that of second portion 50 opening into recess 47.

Second element 9 includes, from its first end 12, a first portion 51 of substantially constant section smaller than the dimensions of recess 47, followed by a second portion 52 of slightly greater section than that of said first portion and ending in second end 13, of the same section as the first portion. Second element 9 further includes a tapped hole 53 arranged from first end 12, in the longitudinal direction of the bracelet.

The third decorative element 18 includes in its wall 20 an aperture 21 of rectangular section whose dimensions are substantially greater than those of second portion 52 of second element 9. Further, the length of said second portion 52 is substantially equal to the thickness of said wall 20.

Screw 34 is arranged in link 1, such that its head 35 and a short part of its rod are housed in cylindrical aperture 48 of first element 2, head 35 abutting against the junction separating portions 49 and 50. In the present variant, head 35 of said screw is accessible via open wall 19 of third decorative element 18. End 44 of screw 34 is screwed into tapped hole 53 of second element 9. Thus, screw 34 is free to rotate about itself without moving with respect to first element 2 whereas its degree of penetration into second element 9 can be modified by screwing or unscrewing it.

Consequently, when screw 34 is screwed into, respectively unscrewed from, second element 9, its first end 12 comes closer, respectively moves away from, wall 11 of first element 2. Insofar as second end 13 of the second element is connected to watch case 22, the latter undergoes the same movements as those described above for first end 12.

One thus obtains, via this relatively simple structure, the possibility of fine adjustment of the position of case 22 with respect to link 1, correcting any lack of continuity between these two elements capable of occurring because of the manufacturing method used to make their respective decorative elements.

One may obviously envisage making, for example first element 2, with a more complex shape, in particular by providing a hollow zone and means for making said hollow zone impervious with respect to the external environment, in order to be able to house electronic components therein.

The preceding description corresponds to preferred embodiments of the invention and should in no way be considered limiting, as regards more particularly the shape described for the various structural elements forming the link according to the invention. Likewise, those skilled in the art are capable of adapting the dimensions of the various structural elements without any difficulty as a function of the nature of the ceramic material employed, for example, to make the mechanical device with sufficient clearance to make continuous junctions between the various decorative elements of the watch.

What is claimed is:

1. A link, provided for connecting a bracelet to the case of a watch, said case including a decorative element which at least partially defines the limits of the case in the longitudinal direction of the bracelet, this decorative element being obtained by a method including a sintering step, wherein said link includes a first hollow element provided with first means for attaching it to the bracelet, a second element one part of which is nested in said first element and carrying second means for attaching said second element to the watch case and a third exterior decorative element, secured to said first element and at least partially covering said second element on the side of said second attaching means, and wherein it includes a mechanical device allowing a translation of the first element with respect to the second element in the direction of the bracelet, so as to apply said third decorative element against the decorative element of said watch case.

2. A link according to claim 1, wherein said third decorative element has longitudinal dimensions greater than 1 centimetre and wherein the latter is also obtained by a method including a sintering step.

3. A link according to claim 1, wherein an aperture is provided in a wall of said first element through which an elongated part of said second element extends and wherein a first end of said second element is housed inside said first element and is coupled to said mechanical device, whereas the second end is located outside said first element and carries said second attaching means.

4. A link according to claim 1, wherein said first element is closed by a removable cover.

5. A link according to claim 2, wherein said third element is made of ceramic material.

6. A link according to claim 1, wherein said first element is force driven in and is held by friction in said third element.

7. A link according to claim 5, wherein said first element is force driven in and is held by friction in said third element.

8. A link according to claim 1, wherein said mechanical device includes resilient means provided for exerting a return force on said first element so as to bring it closer to said second end of said second element and consequently to bring said third element closer to the watch case.

9. A link according to claim 6, wherein said mechanical device includes resilient means provided for exerting a return force on said first element so as to bring it closer to said second end of said second element and consequently to bring said third element closer to the watch case.

10. A link according to claim 8, wherein said first end of said second element includes at least one support surface and wherein said resilient means include at least one spring arranged in abutment on the one hand against said support surface and on the other hand against an inner surface of said first element.

11. A link according to claim 8, wherein said first end of said second element includes at least one support surface and wherein said resilient means include at least one block made of elastomeric material arranged in abutment on the one hand against said support surface and on the other hand against an inner surface of said first element.

12. A link according to claim 8, wherein means are provided to make the interior of said first element impervious.

13. A link according to claim 12, wherein said means include a flat gasket inserted between said first element and said cover and a gasket arranged in said aperture of the first element so as to be in permanent contact with a part of said second element.

14. A link according to claim 12, wherein said first element further includes, inside, electronic components.

15. A link according to claim 3, wherein said mechanical means include means for adjusting relative positions of said first and second elements in the direction of the bracelet.

16. A link according to claim 15, wherein said adjustment means include, in particular, a part mechanically coupled to said second element and wherein a rotation of said part is capable of causing a movement of said first element with respect to said second element in the direction of the bracelet.

17. A link according to claim 16, wherein said part is a screw housed in a hole arranged in said second element, wherein buffers are arranged on said screw on either side of the second element, these buffers being capable of being moved in a perpendicular direction to that of the bracelet, at least one of said buffers being provided with a screw thread, wherein at least an oblique guide with respect to the direction of the bracelet is arranged, for each buffer, on said wall of said first element and/or on said first end of said second element, wherein each oblique guide is arranged in abutment against the corresponding buffer, and wherein a rotation of said screw is capable of modifying the distance between said two buffers and thus the relative positions of said first and second elements.

18. A link according to claim 16, wherein said first and second elements respectively have lateral surfaces located opposite each other which are at least partially in contact with each other, said part being a screw passing through an aperture in said second element which has an elongated oblong section, the threaded end of said screw being housed in a tapped hole arranged through said surface of the first element whereas the head of the screw is, in the tightened position, in abutment against a face of said second element opposite said surface in contact with the first element.

19. A link according to claim 16, wherein said part is a screw whose head is housed so as to rotate freely in a wall of said first element opposite said wall including an aperture, whereas the threaded end is housed in a tapped hole of said first end of said second element.

20. A watch bracelet including two strands each having two ends, a first of said two ends including attaching means to means for closing said bracelet, said second end being connected to a link carrying second means for attaching it to a watch case, said case including a decorative element which at least partially defines the limits of the case in the longitudinal direction of the bracelet, this decorative element being obtained by a method including a sintering step, wherein said link includes a first hollow element provided with first means for attaching it to said second end of the corresponding strand, a second element one part of which is nested with said first element and carrying said second attaching means, a third exterior decorative element, secured to said first element and at least partially covering said second element on the side of said second attaching means, and wherein said link further includes a mechanical device allowing a translation of the first element with respect to the second element in the direction of the bracelet, so as to apply said third decorative element against the decorative element of said watch case.

21. A watch bracelet according to claim 20, wherein said third decorative element has longitudinal dimensions greater than 1 centimetre and wherein the latter is also obtained by a method including a sintering step.

22. A watch bracelet according to claim 20, wherein each of said bracelet strands includes a plurality of links having a similar structure to that of said links attached to the watch case, the first hollow element of each of the links including means for attaching it to the preceding link, the second element of substantially elongated shape of each of the links carrying means for attaching it to the next link.

* * * * *